(12) United States Patent
Schricker

(10) Patent No.: US 11,987,212 B1
(45) Date of Patent: May 21, 2024

(54) ANCHOR BRACKET ASSEMBLY WITH ADJUSTABLE PIN

(71) Applicant: Wilder Side LLC, Peoria, IL (US)

(72) Inventor: David Richard Schricker, Peoria, IL (US)

(73) Assignee: Wilder Side LLC, Peoria, IL (US)

( * ) Notice: Subject to any disclaimer, the term of this patent is extended or adjusted under 35 U.S.C. 154(b) by 58 days.

(21) Appl. No.: 18/065,812

(22) Filed: Dec. 14, 2022

(51) Int. Cl.
| | | |
|---|---|---|
| *B60R 9/04* | (2006.01) | |
| *B60P 7/08* | (2006.01) | |
| *B60R 9/058* | (2006.01) | |

(52) U.S. Cl.
CPC .............. *B60R 9/04* (2013.01); *B60P 7/0807* (2013.01); *B60R 9/058* (2013.01)

(58) Field of Classification Search
CPC .. B60R 9/00; B60R 9/04; B60R 9/048; B60R 9/058; B60R 9/045; B60R 9/052; B60P 7/0807; B60P 7/0815; B60P 7/0823
USPC ................................ 248/499, 500, 503, 505
See application file for complete search history.

(56) References Cited

U.S. PATENT DOCUMENTS

| | | | | | |
|---|---|---|---|---|---|
| 3,698,678 | A | * | 10/1972 | Bowers ................... | B64D 9/003 410/105 |
| 4,062,298 | A | * | 12/1977 | Weik ...................... | B60P 7/0815 410/105 |
| 4,475,854 | A | * | 10/1984 | Ericsson ................. | B60P 7/083 D34/33 |
| D407,298 | S | * | 3/1999 | Hemphill ....................... | D8/367 |
| 6,030,159 | A | * | 2/2000 | Herrick ..................... | B60P 1/52 410/101 |
| 6,908,269 | B1 | * | 6/2005 | Youngs .................. | B60P 7/0823 410/112 |
| 7,175,149 | B2 | * | 2/2007 | Gallien ................... | A47B 97/00 248/500 |
| D565,935 | S | * | 4/2008 | Selby ............................ | D8/356 |
| 8,475,096 | B2 | * | 7/2013 | Spencer ................... | B60J 7/102 410/104 |
| 9,187,047 | B2 | * | 11/2015 | Sautter .................... | B60R 9/045 |
| 10,406,964 | B1 | * | 9/2019 | Thompson ............ | B60P 7/0807 |
| 10,988,148 | B2 | * | 4/2021 | Maki ..................... | B60P 7/0838 |

(Continued)

OTHER PUBLICATIONS

BULK-STRAP Anchor Plate: 1 1/2 to 2 in, Stainless Steel, 2 PK; https://www.grainger.com/product/BULK-STRAP-Anchor-Plate-1-1-2-to-2-in-14A771.

(Continued)

*Primary Examiner* — Jonathan Liu
*Assistant Examiner* — Guang H Guan
(74) *Attorney, Agent, or Firm* — Brian D. Kaul; Westman, Champlin & Koehler, P.A.

(57) ABSTRACT

An anchor bracket assembly is described for securing loads on top of passenger vehicles when used in conjunction with a user-supplied cam buckle strap or ratchet strap. The anchor bracket assembly includes a bracket body, an adjustable load pin, and a means to secure position of the adjustable load pin. The assembly may also include a seal, a backing plate, and mounting hardware. The benefits of the invention include the ability to retain a load hook when tension is released on the strap, and design elements that ensure that mounting bolts do not rotate in the bore holes if the mounting nuts work loose. The design is of sufficient dimensions to enable mounting on composite bodies to distribute loads over a wide area and avoid mechanical failure of the composite body at the mounted location.

12 Claims, 7 Drawing Sheets

(56) References Cited

U.S. PATENT DOCUMENTS

| | | | | |
|---|---|---|---|---|
| 11,167,683 | B2 * | 11/2021 | Carpenter | B60P 7/0807 |
| D981,202 | S * | 3/2023 | Xiaomeng | D8/367 |
| 11,673,505 | B2 * | 6/2023 | Axline | B60P 7/0807 |
| | | | | 244/118.1 |
| 11,897,431 | B2 * | 2/2024 | Holz | B60R 9/048 |
| 2014/0138509 | A1 * | 5/2014 | Lehman | A47B 91/12 |
| | | | | 248/346.11 |

OTHER PUBLICATIONS

Footman Loop; https://www.strapworks.com/1-inch-metal-footman-loop?gclid=CjwKCAjwrdmhBhBBEiwA4Hx5g4ez1hAltLMqish7Cu7UMonpcHV_KnoAbgne8_hX2e_qzSaUsYCUVhoChvsQAD_BWE.
Recessed Flip Ring Anchor; https://www.homedepot.com/p/Keeper-4-7-16-in-Square-Flip-Ring-Recessed-Anchor-89526/204820654.

* cited by examiner

SECTION A-A

SECTION B-B

ANCHOR BRACKET ASSEMBLY WITH ADJUSTABLE PIN

FIELD OF THE INVENTION

This present disclosure relates generally to mounting brackets to secure loads, and in particular to mounting brackets that can be attached to passenger vehicles to secure occasional loads such as waterproof travel bags, kayaks, or canoes.

PRIOR ART

One common means of securing occasional loads on automobiles is to attach a permanent cross bar assembly to the roof of the vehicle, and then attach the occasional loads to the permanent cross member(s). This setup offers both convenience and ease of loading but suffers from high initial cost and slight loss of performance due to wind resistance of the permanently attached cross member.

A simpler method to secure an occasional load on an automobile consists in putting some sort of soft padding between the load and the automobile roof, and then securing the load with straps that loop through the automobile passenger doorframe. While this method is simple and has a cost advantage, the disadvantages can include a loss of environmental sealing around the door and also introduces the potential for permanent damage to door or door seal gaskets.

Prior art for permanently mounted anchor brackets often includes a d-ring to enable engagement of a hook end of a ratchet strap. This works fine as long as the tension holds the hook in the ring. However, when first securing a load, often there is no tension on the strap and the hook can fall out of the d-ring. When securing a load on top of a vehicle, this can require two people to initially secure the load, one to hold one hook in the d-ring while the other person secures the ratchet and corresponding hook on the other side of the vehicle into an opposing d-ring anchor bracket. Additionally, once the strap is removed from a vehicle, the strap and hook can fall out of the "d-ring" and land on people or pets and cause injury.

SUMMARY OF THE INVENTION

A segment of the automobile market appeals to outdoor and wilderness adventure. Many vehicles in this category come in 4 wheel drive configurations, and some include a removable top that has a composite or non-metallic structure. Owners of this vehicle class often customize their vehicle with aftermarket bumpers, lightbars, or winches. At times, these vehicles need attachment points for straps to secure loads. Owners of some models struggle to find acceptable solutions for load securement because permanent load securement devices don't exist for their particular vehicle design.

Ideally, a strap attachment system for this application would include:

1. A design of the strap anchor or attachment point that distributes the load evenly and over a wide area so that the composite roof will not deflect or fail during loading.
2. A design that reduces the likelihood that attachment points will "pull-out" of the thin composite roof material.
3. A design that will accommodate either a cam buckle strap or a rachet strap with hooks on either end, often referred to as a motorcycle strap.
4. A design such that when straps with hooks are used, the hook will not fall out of the anchor bracket when the strap tension is released.
5. A design that enables the hook to be installed or removed into the anchor bracket assembly without the use of hand tools.
5. A design that reduces or prevents side impacts on portions of the tensile strap, thereby preventing abrasion or cuts.
6. A design that is straightforward to install and provides a good mounting surface to ensure environmental sealing, thereby preventing leaks into the interior of the vehicle.

The invention discussed in this disclosure provides solutions to each of the six desired criteria listed above. The invention comprises a bracket body, an adjustable load pin, and a means to secure placement of the adjustable load pin. The bracket body has features that enable it to retain a load hook when used. The bracket body also has features that protect a load strap from abrasion near and when touching the bracket body. The bracket body also has features that enable it to conveniently mount on a flat or slightly curved surface. The adjustable load pin transfers loads from either a hook or a strap into the bracket body. The bracket body contains long bores for mounting hardware, enabling the end-user to conveniently drill holes in the mounting surface using the bracket body bores as guides. The user can easily secure the bracket body to the mounting surface with mounting hardware. The adjustable load pin can easily be partially or completely removed from the bracket body by removing a cotter pin when used. This is particularly useful when inserting a hook into the bracket body. Some embodiments of this invention may include a backing plate, a seal, and mounting hardware to facilitate rapid installation for certain applications. This simple overview only touches the highlights of the present invention.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF DRAWINGS

Embodiments of the disclosure will be better understood by reading of the Detailed Description of the Invention along with a review of the drawings, in which.

DETAILED DESCRIPTION OF THE INVENTION

All illustrations of the drawings are for the purpose of describing selected versions of the present invention and are not intended to limit the scope of the present invention.

The present invention is an anchor bracket assembly meant to work in conjunction with a user-supplied strap or rope to secure large, and often awkward, relatively light loads on rooftops of passenger vehicles primarily. These loads consist of kayaks, canoes, and similar large bulky gear. The present invention could also be used on travel or utility trailers to provide additional attachment points for similar load securement. The anchor bracket assembly provides a fixed point for a user to attach the ends of either a rope, cam buckle strap, or a ratchet strap containing hooks as those familiar in the art of vehicle load securement will understand.

Figure 1:
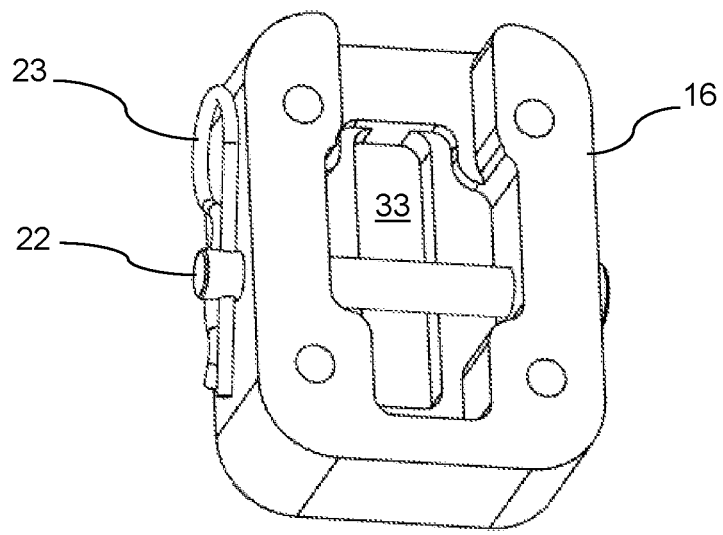
FIG. 1 is a perspective view of an anchor bracket assembly according to one embodiment of the disclosure.

According to one embodiment of the invention as illustrated in FIG. 1, an anchor bracket assembly 10 includes a bracket body 16, an adjustable load pin 22, and a cotter pin 23. The purpose of the cotter pin 23 is to secure the location of the adjustable load pin 22 inside the bracket body 16 as shown in FIG. 1. Alternate embodiments not shown could also include an adjustable load pin 22 of a different design meant to lock in place with an included spring-loaded ball or a twist-tab lock incorporated into the adjustable load pin 22, replacing the function of and eliminating the need for the cotter pin 23.

Figure 2:
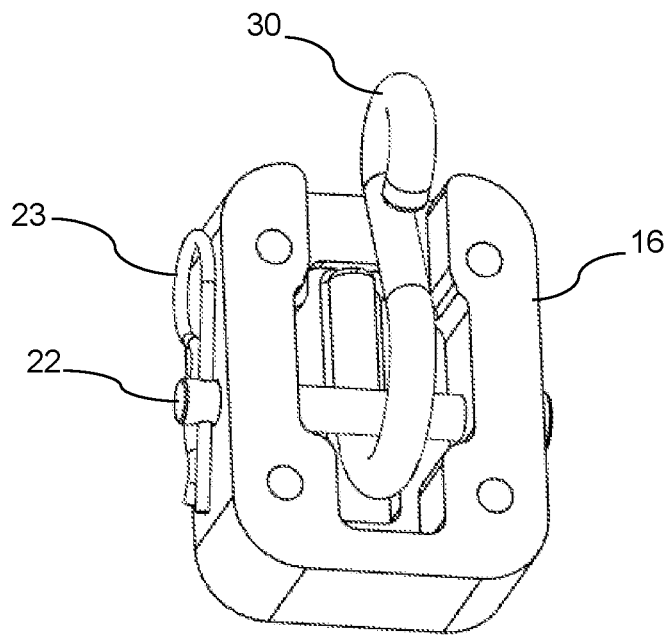
FIG. 2 is a perspective view of an anchor bracket assembly according to an alternate embodiment of the disclosure.

Alternate embodiments will also be disclosed and discussed in more detail. In a first alternate embodiment of the invention as illustrated in FIG. 2, the anchor assembly includes the elements of the embodiment illustrated in FIG. 1 and also includes a load hook 30.

Figure 11:
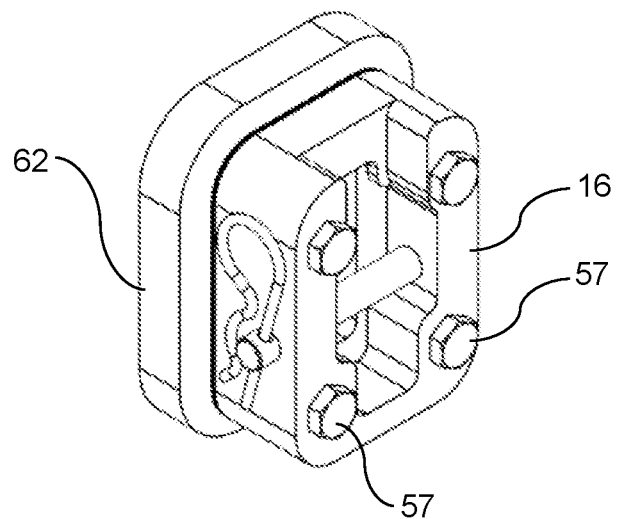
FIG. 11 is a perspective view of an anchor bracket assembly according to an alternate embodiment of the disclosure.
Figure 12:
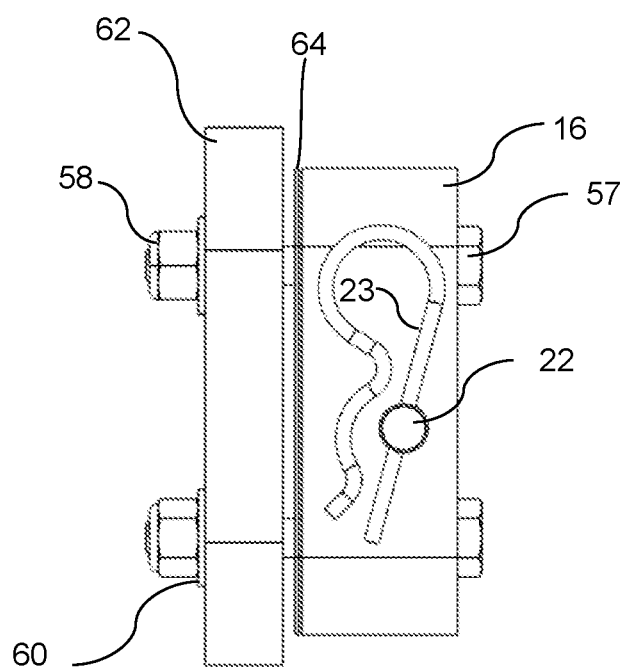
FIG. 12 is a side view of the anchor bracket assembly embodiment of FIG. 11.
Figure 13:
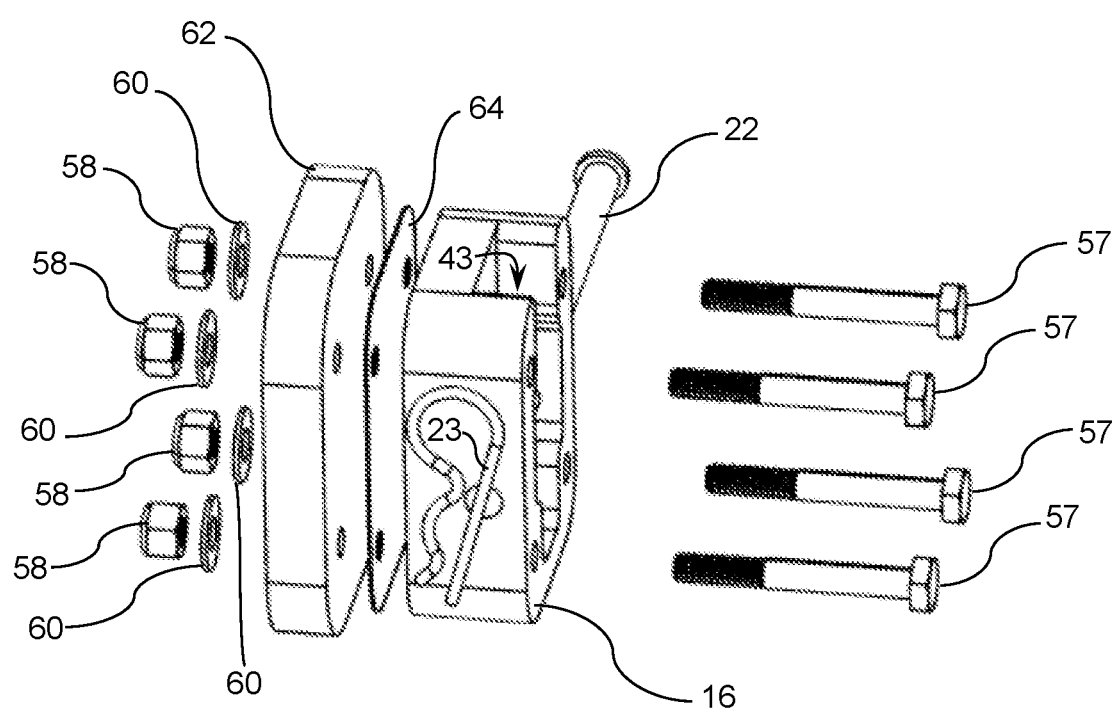
FIG. 13 is an exploded perspective view of the anchor bracket assembly embodiment of FIG. 11.

FIG. 11, FIG. 12 and FIG. 13 show an alternate embodiment of the invention that includes the bracket body 16, the adjustable load pin 22, the cotter pin 23, a backing plate 62, a seal 64, a bolt(s) 57, a washer(s) 60, and a nut(s) 58.

It should be noted that each embodiment of the invention described in this disclosure contains the bracket body 16, and each embodiment in this disclosure feature the same bracket body 16 design. Therefore, a feature of the bracket body 16 described in one embodiment should be understood to exist in each bracket body 16 contained in any embodiment of the invention.

Figure 3:
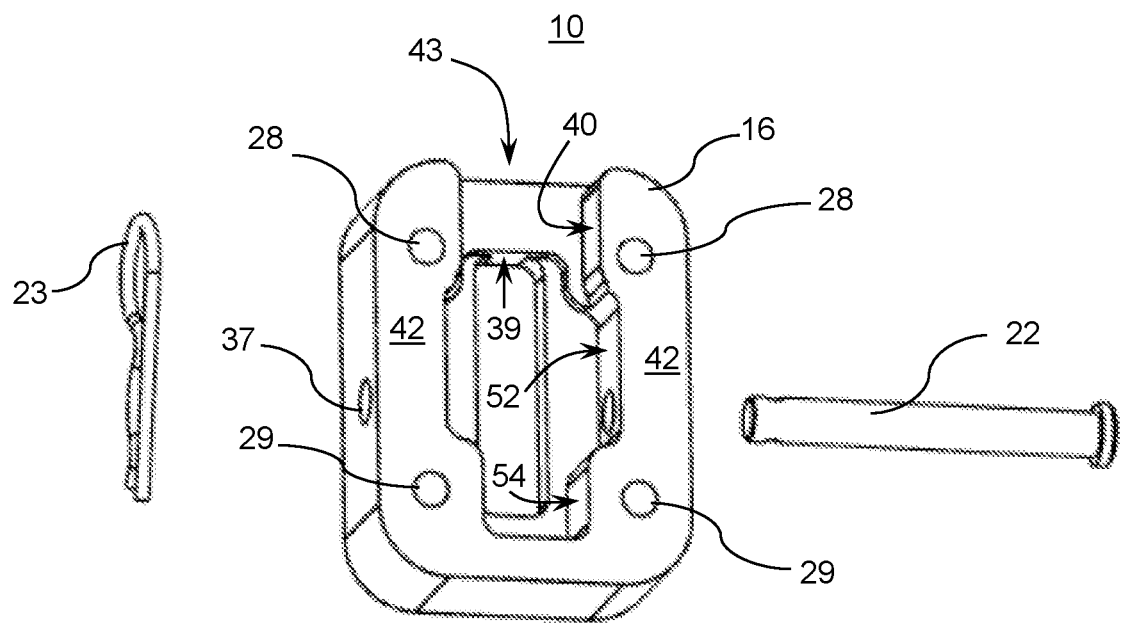
FIG. 3 is an exploded perspective view of the anchor bracket assembly embodiment of FIG. 1.
Figure 4:
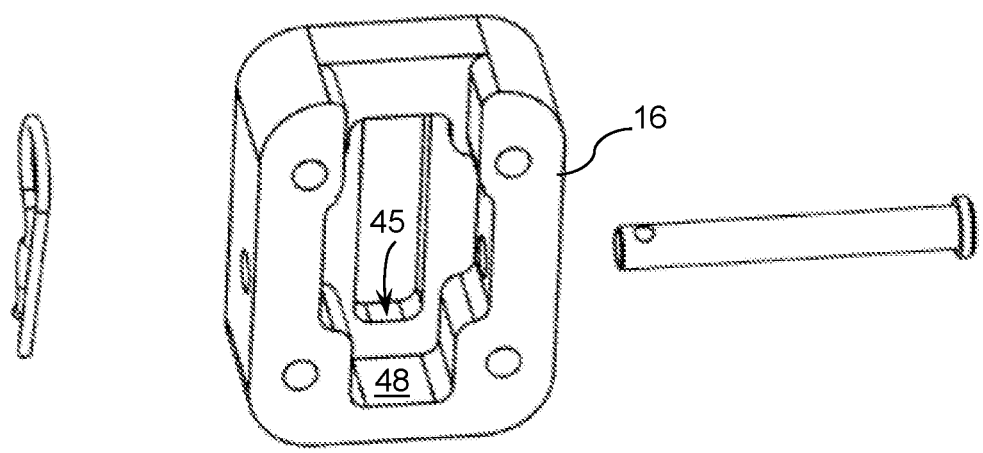
FIG. 4 is an exploded perspective view of the anchor bracket assembly embodiment of FIG. 1.

Referring to FIG. 1, FIG. 3 and FIG. 4, the anchor bracket assembly 10 contains many useful features to enable the invention to secure loads using commonly available strapping solutions such as cam buckle straps or ratchet straps. The bracket body 16 has an upper cavity wall 40, a strap slot 43, an upper mounting hole 28, a lower mounting hole 29, a middle cavity wall 52, a lower cavity wall 54, a recessed hook slot 33, an upper hook stop surface 39, a front face 42, a pin cross-hole 37, a lower hook inner stop surface 45, and a lower hook outer stop surface 48.

The invention has several useful features when combined with a cam buckle strap for load securement. Those skilled in the art of cartop loading will be familiar with cam buckle straps or ratchet straps. Referring now to FIG. 1 and FIG. 3, the bracket body 16 is symmetrical about a vertical plane parallel to, and bisecting midway between, the upper mounting holes 28 and the lower mounting holes 29. Through this symmetry, it is to be understood that there is a left and right upper cavity wall 40, a left and right middle cavity wall 52, and a left and right lower cavity wall 54. The present invention incorporates several design features to enable easy and secure use of cam buckle straps. The non-buckle end of a cam buckle strap can be easily inserted into the strap slot 43, wrapped around the adjustable load pin 22, and then pulled back on top of itself. As seen in FIG. 3, the left and right middle cavity walls 52 creates a slightly wider cavity to enable fingers to push the end of a load strap around the adjustable load pin 22. This wider cavity also reduces the likelihood that a strap will get pinched between the bracket body 16 and the adjustable load pin 22 as the strap experiences movement due to tension or shifting loads. In addition, the height of the upper cavity wall 40 as seen in FIG. 3 creates a barrier from foreign bodies that might abrade or rub against a strap secured around the adjustable load pin 22. The wide stance between the upper mounting holes 28 and the lower mounting holes 29 enable the bracket to absorb and transmit a lower torque load to the mounting surface. This is an important feature, especially if the mounting surface is a non-metallic composite material with limited mechanical properties.

FIG. 2 is a representative embodiment of the invention when the hook 30 is used to engage with the bracket body 16. The user may install the hook 30 into the bracket body 16 and then slide the adjustable load pin 22 through the pin cross-hole 37 and then secure the position of the adjustable load pin 22 with the cotter pin 23. The position of the adjustable load pin 22 with respect to the hook 30 effectively locks the large end of the hook 30 into the recessed hook slot 33, a design feature of the bracket body 16 as shown in FIG. 1. This limits the lateral or side-to-side movement of the hook 30. With the hook 30 secure in a first bracket assembly 10, the user is then able to throw the free end of a load strap over the intended load and walk around the vehicle to secure a second hook 30 into a second anchor bracket assembly 10 in similar fashion.

Figure 5:
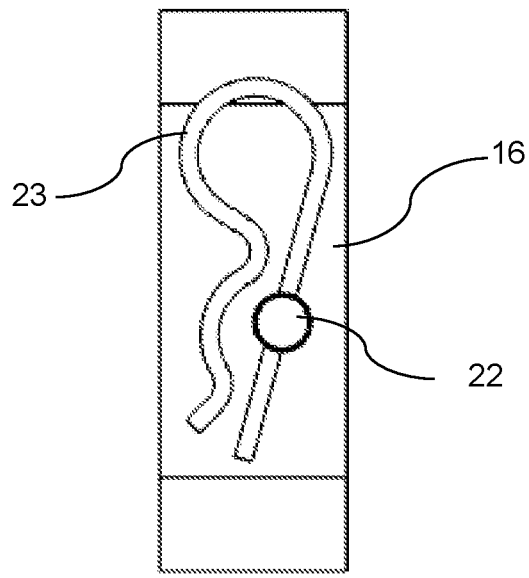
FIG. 5 is a side view of the anchor bracket assembly embodiment of FIG. 1.
Figure 6:
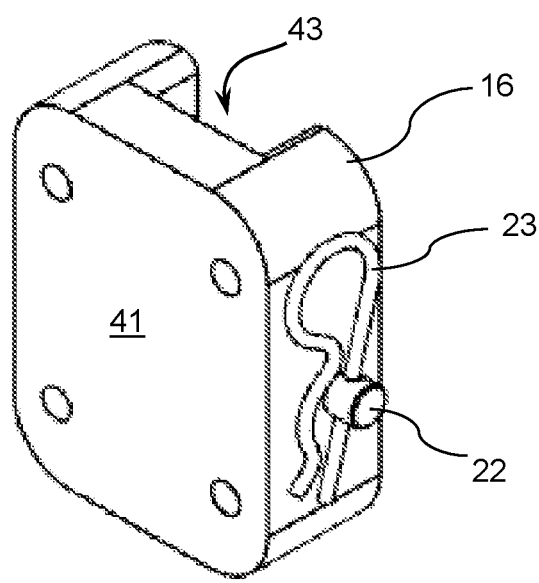
FIG. 6 is a perspective view of the anchor bracket assembly embodiment of FIG. 1.
Figure 7:
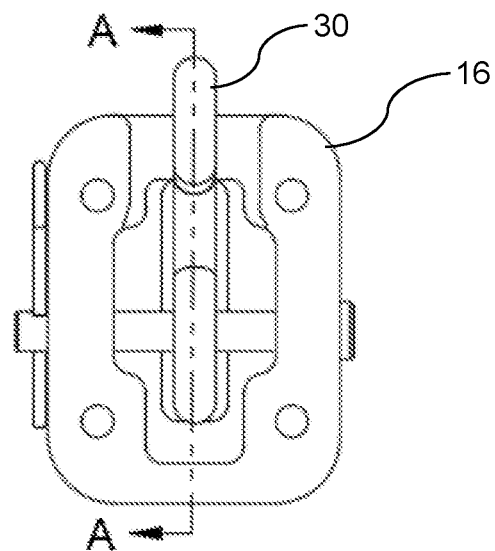
FIG. 7 is a front view of the anchor bracket assembly embodiment of FIG. 2.

FIG. 5 is a side view of the embodiment of FIG. 1 in which the cotter pin 23 is clearly visible. The depth of the bracket body shields the cotter pin 23 from hanging out in space which is important if the bracket body 16 is mounted adjacent to a passenger vehicle door. The design of the anchor bracket assembly 10 enables the cotter pin 23 to remain generally static relative to the bracket body 16 because if the adjustable load pin 22 tries to rotate, one of the ends of the cotter pin 23 will begin to contact the mounted surface (adjacent to the left side of FIG. 5), preventing further rotation.

The present invention incorporates several design features to eliminate unintended hook disengagement from the bracket body. Referring to FIG. 1, FIG. 2, FIG. 3, and FIG. 4, the means to secure the hook 30 in place will be explained. The open end of the hook 30 is positioned flush with, and constrained in sideways movement by, the recessed hook slot 33. Upwards vertical movement of the hook 30 is constrained by the adjustable load pin 22 and the upper hook stop surface 39 acting independently or together, depending on the shape of the particular hook used. Correspondingly, downward vertical movement of the hook 30 is limited by engagement of the hook 30 with the lower hook inner stop surface 45 and/or the lower hook outer stop surface 48.

Referring now to an alternate embodiment as seen in FIG. 11, FIG. 12 and FIG. 13, the typical use case involves first permanently mounting the bracket body 16 onto a vehicle or trailer. In a typical use case, the bracket body 16 is oriented so that the strap slot 43 is up and the adjustable load pin 22 is generally horizontal. The user would place the bracket body 16 at the desired mount location and use a drill to create holes in the mounting surface (not shown) corresponding to the diameter of the upper mounting holes 28 and the lower mounting holes 29 and then secure the entire assembly to the vehicle by arranging the assembly as shown in FIG. 13, making sure that the mounting surface is located between the seal 64 and the backing plate 62. An effective environmental seal is created as the user tightens each nut 58 onto the corresponding bolt 57, thereby compressing the seal 64 against both the bracket back surface and the adjacent mounting surface.

Figure 8:
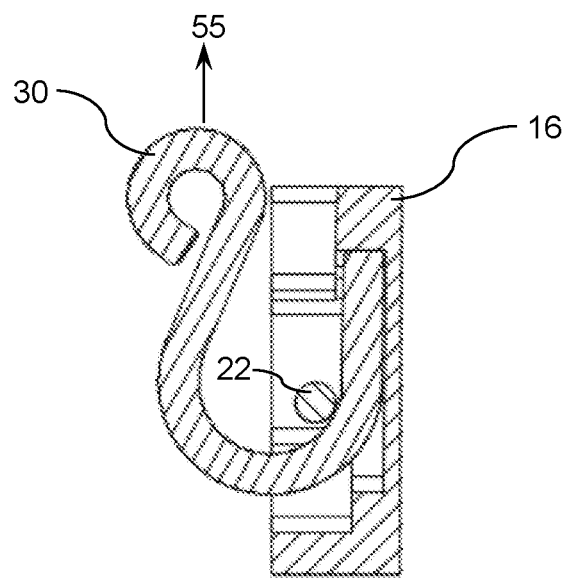
FIG. 8 is a sectional cut view taken about line A-A in FIG. 7.

Referring to FIG. 3, FIG. 6, FIG. 7 and FIG. 8, one advantage of the present invention is to distribute torque loads more effectively to reduce stress in the mounted surface. FIG. 8 shows a section view illustrating how the hook 30 engages with the bracket body 16 and the adjustable load pin 22. A force vector 55 represents a tensile load created by a load strap or load rope attached to a smaller loop end of the hook 30. In FIG. 8, there is a moment created which wants to rotate the bracket body 16 clockwise due to the orientation of the force vector 55 relative to the mounting surface. By designing the bracket body 16 with four mounting holes and a distance between the upper mounting holes 28 and the lower mounting holes 29 which is greater than the space between the upper mounting holes 28 or the lower mounting holes 29, the tall stature of the bracket body 16 interacts with the mounting surface and more effectively resists the rotating moment, thereby reducing the overall stress induced on the mounted surface structure.

Figure 9:
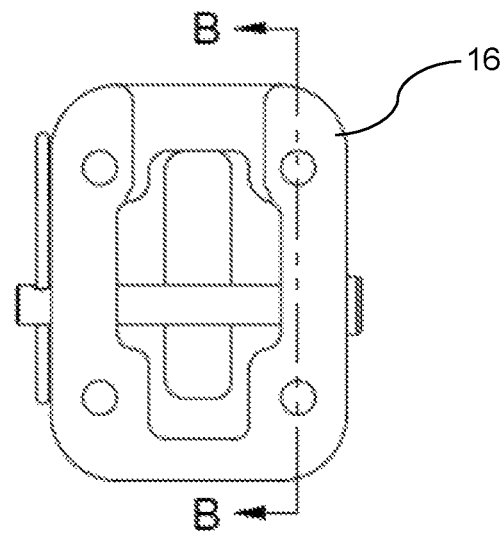
FIG. 9 is a front view of the anchor bracket assembly embodiment of FIG. 1.
Figure 10:
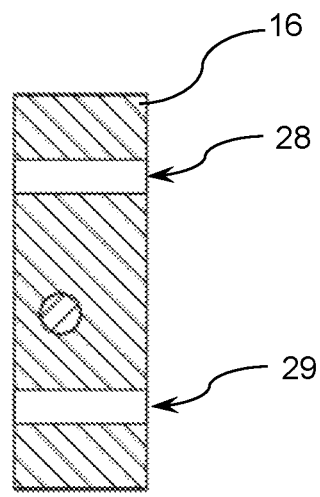
FIG. 10 is a sectional cut view taken about line B-B in FIG. 9.

Another feature of the bracket body 16 provides gentler stresses on the mounted surface. As seen in FIG. 9 and FIG. 10, the extensive depth of the upper mounting holes 28 and the lower mounting holes 29 ensure that the orientation of an assembly bolt inserted into one of said mounting holes will remain essentially constant with a bracket back surface 41. This is possible because of the stiff nature of the bracket body 16 material and the way the walls of the mounting holes interact at different points along the bolt to keep the orientation of the bolt generally in line with the borehole axis of the mounting holes. This helps prevent the attachment hardware from rotating and pulling out of the mounted surface should the attachment joint begin to loosen.

An important feature of any permanently attached anchor bracket is that it fit the aesthetic of the vehicle it is mounted to. In the preferred embodiment, the material of the bracket body 16 is a plastic material with a textured surface on the front face 42, reducing any glare and blending the texture of the front face 42 to that of the mounted surface.

Numerous characteristics and advantages of have been set forth in the foregoing description, together with the details of structure and function. Many of the novel features are pointed out in the appended claims. The disclosure, however, is illustrative only, and changes may be made in detail, especially in matters of size, shape, and arrangement of parts, indicated by the broad general meaning of the terms in which the general claims are expressed. It is noted that the term pin is used in the generic sense, and any hardware useful for the purpose of functioning as a pin may be substituted. It is further noted that, as used in this application, the singular forms "a", "an", and "the" include plural referents unless expressly and unequivocally limited to one referent.

The invention claimed is:

1. An anchor bracket assembly comprising:
   a bracket body comprising:
      a top surface;
      a bottom surface opposite the top surface and displaced from the top surface along a vertical axis;
      first and second side surfaces extending between the top and bottom surfaces and oriented parallel to the vertical axis and parallel to a longitudinal axis that is perpendicular to the vertical axis;
      first and second end surfaces each extending between the top and bottom surfaces and between the first and second side surfaces, the first and second end surfaces oriented parallel to the vertical axis and perpendicular to the longitudinal axis;
      a cavity having an opening in the top surface, and a cavity base surface oriented parallel to the top surface and displaced from the top surface along the vertical axis;
      a strap slot formed through the top surface and the first end surface and extending along the longitudinal axis to the cavity;
      a hook slot recessed along the vertical axis from the cavity base surface and extending along the longitudinal axis, the hook slot defined by a hook slot base surface oriented parallel to the cavity base surface, opposing hook slot end walls displaced from each other along the longitudinal axis and extending along the vertical axis from the hook slot base surface, and opposing hook slot side walls extending between the hook slot end walls along the longitudinal axis, displaced from each other along a horizontal axis that is perpendicular to the longitudinal and vertical axes, and extending from the hook slot base surface along the vertical axis;
      at least two mounting holes each extending along the vertical axis from the top surface to the bottom surface;
      a first pin bore extending through the first side surface to the cavity along the horizontal axis; and
      a second pin bore extending through the second side surface to the cavity along the horizontal axis; and
   a pin member extending through the first and second pin bores and the cavity.

2. The anchor bracket assembly of claim 1, wherein, when a hook member comprising a bent rod having a hook end that forms a hook is received within the cavity:
   the pin member is configured to extend through the hook; and
   the hook slot is configured to receive the hook end, the hook slot end walls and the hook slot side walls are configured to limit rotation of the hook member about the vertical axis, and the hook slot base surface is configured to limit rotation of the hook member about the horizontal axis.

3. The anchor bracket assembly of claim 1, wherein the at least two mounting holes comprise four mounting holes.

4. The anchor bracket assembly of claim 1, wherein a width of the cavity, which is measured along the horizontal axis, is greater than a width of the strap slot.

5. The anchor bracket assembly of claim 1, wherein the top surface comprises a texture.

6. The anchor bracket assembly of claim 1, wherein:
the pin member comprises a first end having a pin head and a second end comprising a pin bore extending transversely to a central axis of the pin member; and
the anchor bracket assembly includes a cotter pin configured to extend through the pin bore to secure the pin member in the first and second pin bores of the bracket body.

7. The anchor bracket assembly of claim 1, further comprising:
a backing plate having at least two mounting holes that are configured to align with the at least two mounting holes of the bracket body;
a compressible seal configured to be positioned between the bottom surface of the bracket body and the backing plate;
at least one bolt, each configured to extend through one of the mounting holes of the bracket body and the backing plate; and
at least one nut, each configured to be screwed onto an end of one of the at least one bolt.

8. The anchor bracket assembly of claim 1, wherein:
the anchor bracket assembly includes a hook member comprising a bent rod having a hook end that forms a hook, the hook received within the cavity and extending along the longitudinal axis;
the pin member extends through the hook;
the hook end is received within the hook slot;
the hook slot end walls and the hook slot side walls limit rotation of the hook member about the vertical axis; and
the hook slot base surface limits rotation of the hook member about the horizontal axis.

9. An anchor bracket assembly comprising:
a bracket body comprising:
  a top surface;
  a bottom surface opposite the top surface and displaced from the top surface along a vertical axis;
  first and second side surfaces extending between the top and bottom surfaces and oriented parallel to the vertical axis and parallel to a longitudinal axis that is perpendicular to the vertical axis;
  first and second end surfaces each extending between the top and bottom surfaces and between the first and second side surfaces, the first and second end surfaces oriented parallel to the vertical axis and perpendicular to the longitudinal axis;
  a cavity having an opening in the top surface, and a cavity base surface oriented parallel to the top surface and displaced from the top surface along the vertical axis;
  a strap slot formed through the top surface and the first end surface and extending along the longitudinal axis to the cavity, a width of the cavity, which is measured along a horizontal axis that is perpendicular to the longitudinal and vertical axes, is greater than a width of the strap slot;
  a hook slot recessed along the vertical axis from the cavity base surface and extending along the longitudinal axis, the hook slot defined by a hook slot base surface oriented parallel to the cavity base surface, opposing hook slot end walls displaced from each other along the longitudinal axis and extending along the vertical axis from the hook slot base surface, and opposing hook slot side walls extending between the hook slot end walls along the longitudinal axis, displaced from each other along the horizontal axis, and extending from the hook slot base surface along the vertical axis;
  at least two mounting holes each extending along the vertical axis from the top surface to the bottom surface;
  a first pin bore extending through the first side surface to the cavity along the horizontal axis; and
  a second pin bore extending through the second side surface to the cavity along the horizontal axis;
a pin member extending through the first and second pin bores and the cavity;
a backing plate having at least two mounting holes that are configured to align with the at least two mounting holes of the bracket body;
a compressible seal configured to be positioned between the bottom surface of the bracket body and the backing plate;
at least one bolt, each configured to extend through one of the mounting holes of the bracket body and the backing plate; and
at least one nut, each configured to be screwed onto an end of one of the at least one bolt.

10. The anchor bracket assembly of claim 9, wherein the top surface comprises a texture.

11. The anchor bracket assembly of claim 9, wherein:
the pin member comprises a first end having a pin head and a second end comprising a pin bore extending transversely to a central axis of the pin member; and
the anchor bracket assembly includes a cotter pin configured to extend through the pin bore to secure the pin member in the first and second pin bores of the bracket body.

12. The anchor bracket assembly of claim 9, wherein:
the anchor bracket assembly includes a hook member comprising a bent rod having a hook end that forms a hook, the hook received within the cavity and extending along the longitudinal axis;
the pin member extends through the hook;
the hook end is received within the hook slot;
the hook slot end walls and the hook slot side walls limit rotation of the hook member about the vertical axis; and
the hook slot base surface limits rotation of the hook member about the horizontal axis.

* * * * *